United States Patent [19]
Hachinohe et al.

[11] Patent Number: 5,243,834
[45] Date of Patent: Sep. 14, 1993

[54] LOW TEMPERATURE FOOD STORAGE EQUIPMENT

[75] Inventors: Yutaka Hachinohe, Sapporo; Akihide Imamura, Chiba; Masatoshi Sasaki, Otaru; Shoichi Yokochi, Sapporo; Kazuyuki Ouchi, Tokyo, all of Japan

[73] Assignees: Mitsui O.S.K. Lines, Ltd., Tokyo; Obayashi Corporation, Osaka; Taihei Sangyo Co., Ltd., Hokkaido; Hazama Corp., Tokyo, all of Japan

[21] Appl. No.: 854,576

[22] Filed: Mar. 20, 1992

[30] Foreign Application Priority Data

| Mar. 20, 1991 | [JP] | Japan | 3-024298[U] |
| Mar. 20, 1991 | [JP] | Japan | 3-080365 |
| Mar. 20, 1991 | [JP] | Japan | 3-080366 |
| Jul. 2, 1991 | [JP] | Japan | 3-186968 |

[51] Int. Cl.⁵ .............................. F25D 17/02
[52] U.S. Cl. ....................... 62/434; 62/406; 62/425
[58] Field of Search ............... 62/59, 412, 410, 425, 62/430, 434, 406

[56] References Cited

U.S. PATENT DOCUMENTS

| 150,644 | 5/1874 | Wilkinson | 62/434 |
| 1,589,484 | 6/1926 | Reinholt | 62/425 |
| 2,221,971 | 11/1940 | Haywood | 62/235.1 |
| 4,099,558 | 7/1978 | Bricard et al. | 62/59 |
| 4,178,770 | 12/1979 | Fox | 62/412 |
| 4,244,193 | 1/1981 | Haakenson | 62/412 |
| 4,250,716 | 2/1981 | Huffman | 62/412 |
| 4,989,417 | 2/1991 | Markiewicz | 62/407 |

*Primary Examiner*—Ronald C. Capossela
*Attorney, Agent, or Firm*—Wenderoth, Lind & Ponack

[57] ABSTRACT

The low temperature food storage equipment of the present invention is provided with an icehouse and a food storeroom each surrounded by a heat insulator. The icehouse and the storeroom are connected by a detachable heat exchanger disposed therebetween. In the icehouse there is stored water which is frozen into ice when the outside air grows cold. In the storeroom there are kept in cold storage a large amount of shippable food, for example, potatoes. In the case of shipping the food, the heat exchanger is removed and the food is transported on a truck or the like while being kept in cold storage in the storeroom.

8 Claims, 8 Drawing Sheets

|  | STABLE STATE | UPPER PORTION TEMP. >4°C | LOWER PORTION TEMP. >2°C | LOWER PORTION TEMP. <0°C | UPPER PORTION TEMP. <2°C |
|---|---|---|---|---|---|
| FAN1 | OFF | ON | OFF | OFF | OFF |
| FAN2 | ″ | OFF | ″ | ON | ″ |
| FAN3 | ″ | ″ | ″ | ″ | ″ |
| FAN4 | ″ | ON | ″ | OFF | ″ |
| D-1 | ″ | ″ | ″ | ″ | ″ |
| D-2 | ″ | OFF | ″ | ON | ″ |
| D-3 | ″ | ″ | ″ | ″ | ″ |
| D-4 | ″ | ON | ″ | OFF | ″ |

LOW TEMPERATURE FOOD STORAGE EQUIPMENT

BACKGROUND OF THE INVENTION

1. Field of the Invention

The present invention relates to low temperature or cold food storage equipment and, more particularly, to low temperature food storage equipment with which it is possible to keep food in cold storage for a long period of time through utilization of low temperatures available during the winter in cold districts and to transport the food while keeping it cold in the storeroom without the necessity of transshipping it to a refrigerator truck or the like.

2. Description of the Prior Art

One method that has heretofore been used to keep food in cold storage is to utilize low temperatures available during the winter in cold districts. A simple storage facility that uses this method is a storage pit which is dug in the ground and utilizes latent and sensible heat of the surrounding frozen soil to keep food in cold storage for a long period of time.

There has been proposed the use of heat pipes for quickly forming a frozen soil layer around the storage pit as disclosed in Japanese Patent Laid-Open Publication No. 233957/90, for example. The cold storage equipment described in this Japanese document is made up of a water-barrier heat insulating layer provided in the ground, a food storeroom provided inside the heat insulating layer, and heat pipes having their lower end portions inserted into the ground between the water-barrier heat insulating layer and the stockroom. However, the cold storage equipment of this kind has technical problems described below.

With the cold storage equipment set forth in the above-identified Japanese document, food is kept at low temperatures in the underground storeroom during the winter, and hence in the case of shipment it must be carried out of the storeroom and loaded on a refrigerated truck or the like; this is very time-consuming and laborious work.

Moreover, the frozen soil layer, which serves as a cooling or chilling source, is frozen by letting in the cold or chilly outside air through the heat pipes, and hence its frozen state varies with the outside air temperature.

SUMMARY OF THE INVENTION

It is therefore an object of the present invention to provide low temperature food storage equipment which enables food kept in cold storage to be transported without being reshipped to other transportation means and to be preserved well during the transportation period, for example, for at least several days.

To attain the above object, the low temperature food storage equipment of the present invention, which includes an icehouse an a food storeroom each surrounded by a heat insulator, is characterized in that a detachable heat exchanger is interposed between the icehouse and the storeroom.

The heat exchanger can be formed by a first heat exchanging pipe extending from the lower portion of the icehouse to the upper portion of the food storeroom and a second heat exchanging pipe extending from the upper portion of the icehouse to the lower portion of the food storeroom. Each of the first and second heat exchanging pipes has a pair of branch lines, wherein flow-direction switching means and air supply means may be provided.

With the low temperature food storage equipment of the above construction, the temperature in the icehouse is substantially free from the influence of a change in the outside air temperature, because the icehouse is surrounded by the insulator. The source for cooling the storeroom is ice frozen by the outside air, and hence the temperature and humidity in the storeroom are stable. The temperature in the storeroom wherein perishable foods are stocked is controlled to stay within a predetermined temperature range on the basis of a detected value of a temperature sensor. Moreover, the heat exchanger interposed between the icehouse and the storeroom, which is freestanding, is detachable, and when it is removed, the storeroom can be loaded on a truck or the like, with foods stocked therein.

While the specification concludes with claims particularly pointing out and distinctly claiming the subject matter of the invention, it is believed the invention will be better understood from the following description taken in connection with the accompanying drawings.

DETAILED DESCRIPTION OF THE PREFERRED EMBODIMENTS

A description will be given, with reference to the drawings, of preferred embodiments of the present invention. FIGS. 1 through 8 illustrate an embodiment of the low temperature food storage equipment according to the present invention, which has an icehouse 10 and a freestanding food storeroom 26 each enveloped by a heat insulator. The icehouse 10 and the storeroom 26 are interconnected by a detachable heat exchanger 12 disposed between them.

Figure 3:
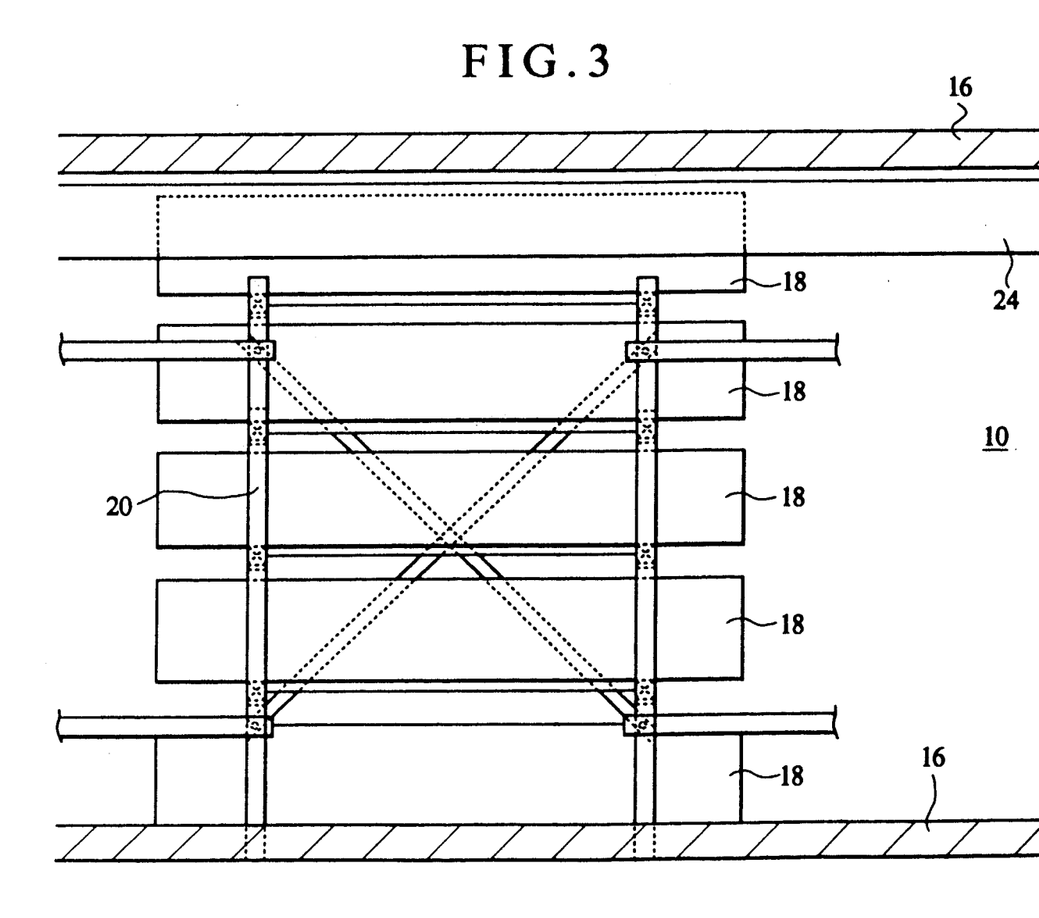
FIGS. 3 and 4 are schematic diagrams of an icehouse of the storage equipment.
Figure 4:
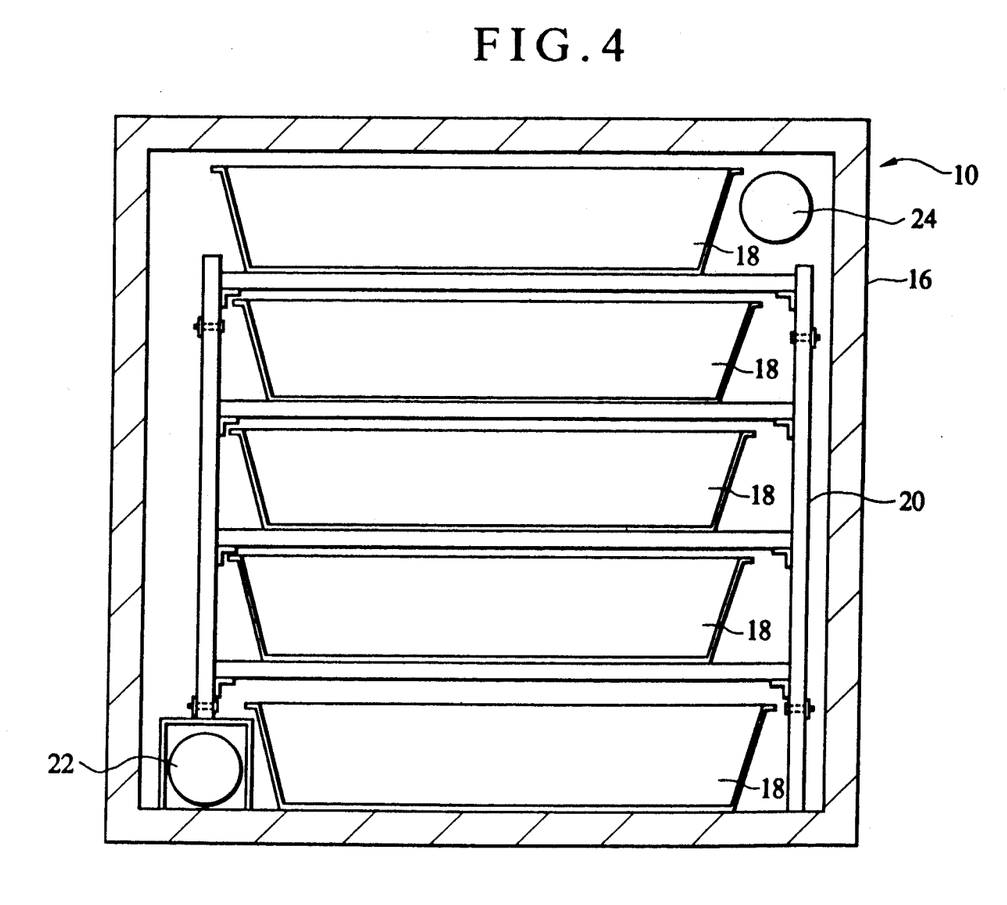

The icehouse 10 is rectangular parallelepipedic in shape and is composed of an icehouse body 16 having a door 14 at one end and entirely surrounded by a heat insulator and trays 18 placed therein. As shown in FIGS. 3 and 4, the trays 18 are mounted on shelves 20 provided one above another at predetermined intervals in the icehouse body 16. The trays 18 are each inverted trapezoidal in cross section and constructed so that they will not break even when water contained therein freezes.

The water to be contained in such a tray 18 is water that has dissolved therein a predetermined amount of salt, for instance. The water is cooled and frozen into ice by the cold outside air which is admitted into the icehouse body 16 by opening the door 14. When the water in each tray 18 is thus frozen into ice, the door 14 is closed.

Figure 5:
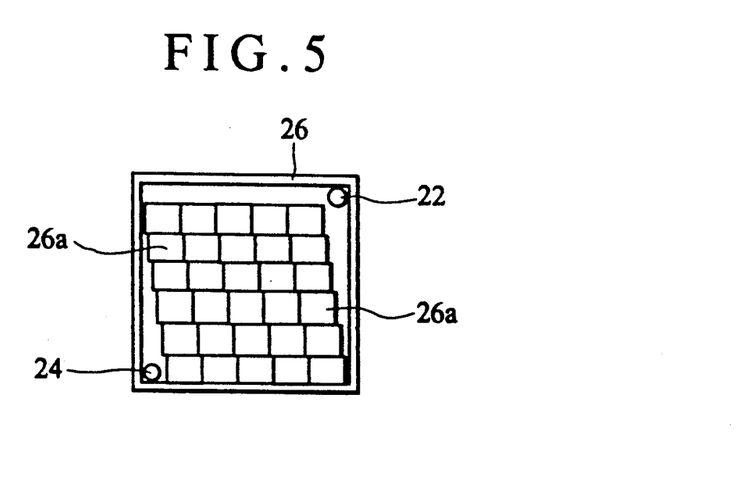
FIG. 5 is a schematic diagram of a food storeroom of the storage equipment.

The storeroom 26 for storing perishable foods is provided adjacent the icehouse 10, and in this embodiment the former has about the same shape as that of the latter. FIG. 5 is a cross-sectional view of the storeroom 26, which is surrounded by a heat insulator and in which foods (potatoes, for example) 26a packed in cardboard boxes or similar containers are placed one above another.

Figure 1:
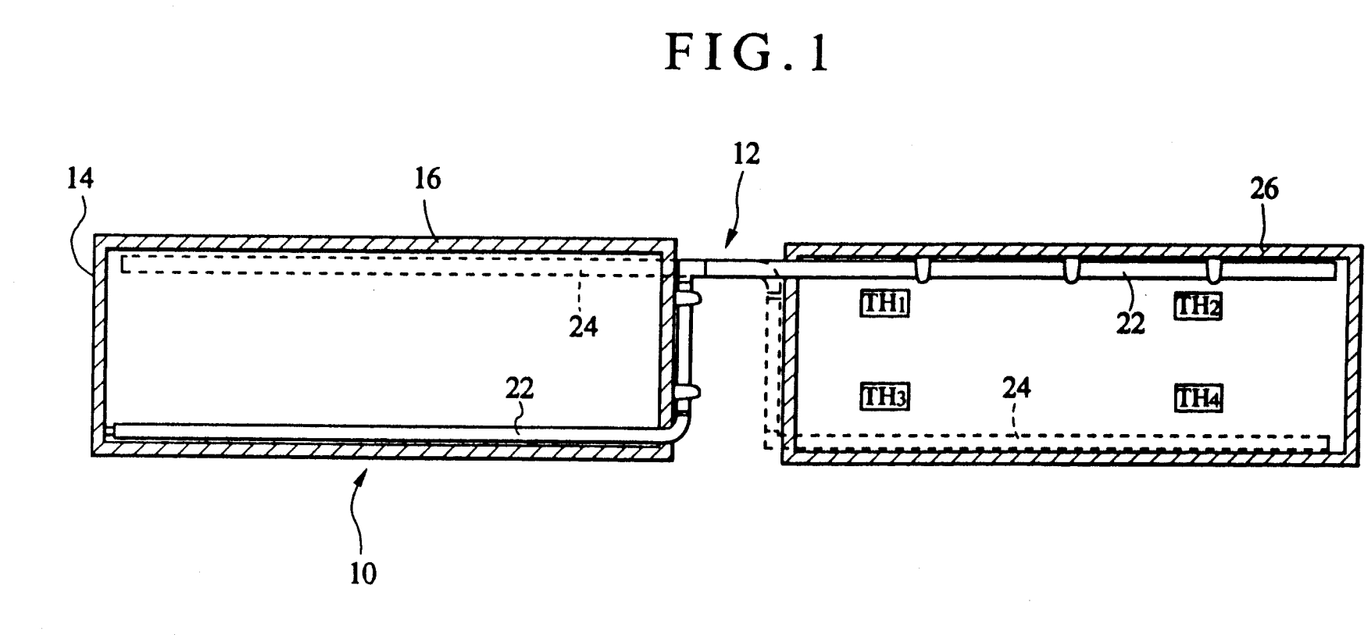
FIG. 1 is a longitudinal-sectional view of an embodiment of low temperature storage equipment according to the present invention.
Figure 2:
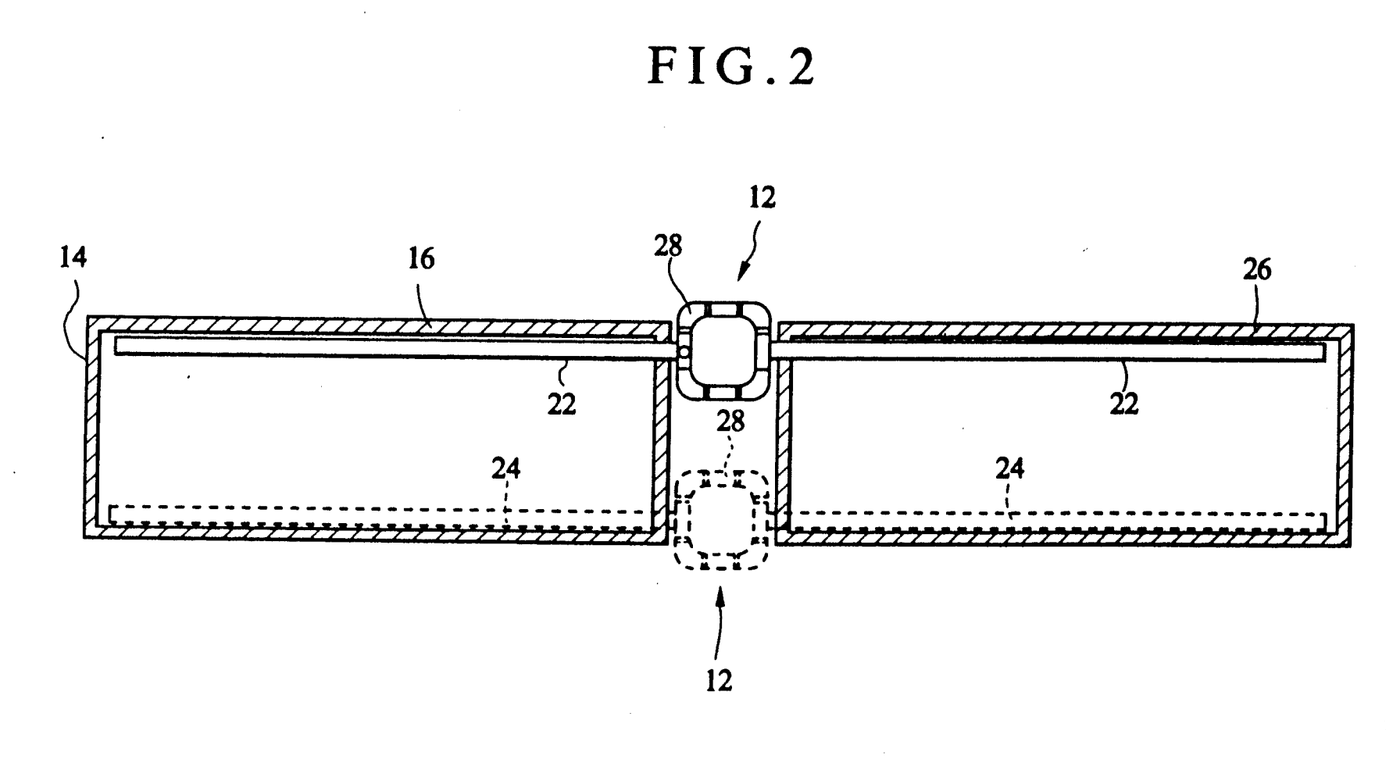
FIG. 2 is a cross-sectional view of the low temperature storage equipment shown in FIG. 1.

The heat exchanger 12 comprises, in this embodiment, a first heat exchanging pipe 22 which extends along the bottom of the icehouse body 16 and thence to and along the ceiling of the storeroom 26 and a second heat exchanging pipe 24 which extends along the ceiling of the icehouse body 16 and thence to and along the bottom of the storeroom 26. The heat exchanging pipes 22 and 24 are made of vinyl chloride and each portion extending in the icehouse body 16 and the storeroom 26 has a number of perforations. The sum total of the areas of such perforations made in each pipe is nearly equal to the cross-sectional area of the pipe.

The heat exchanging pipes 22 and 24 are detachably connected to the storeroom 26 by means of, for instance, couplings composed of bolts and nuts and disposed between branches 28 of the pipes 22 and 24 and the storeroom 26 in such a manner that the pipes 22 and 24 are partly left in the storeroom 26 when they are disconnected from the icehouse 10. Of course, the pipes 22 and 24 are adapted so that they can be pulled out of the storeroom 26 entirely.

Figure 6A:
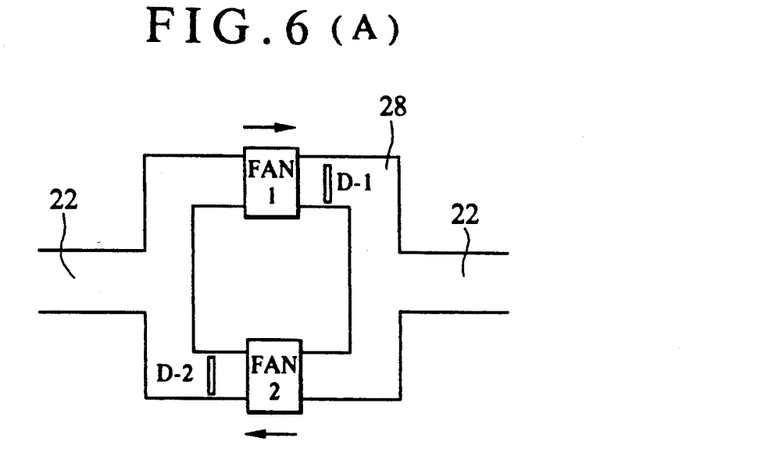
FIGS. 6A and 6B are schematic diagrams of the principal parts of heat exchanging pipes for use in the storage equipment.
Figure 6B:
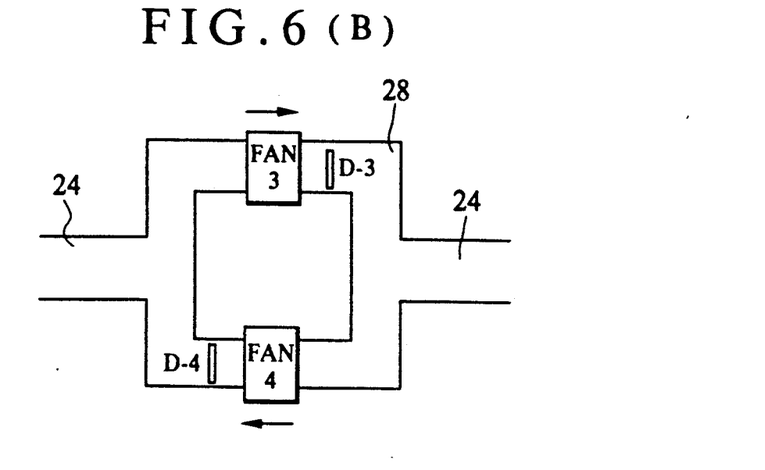
Figure 7:
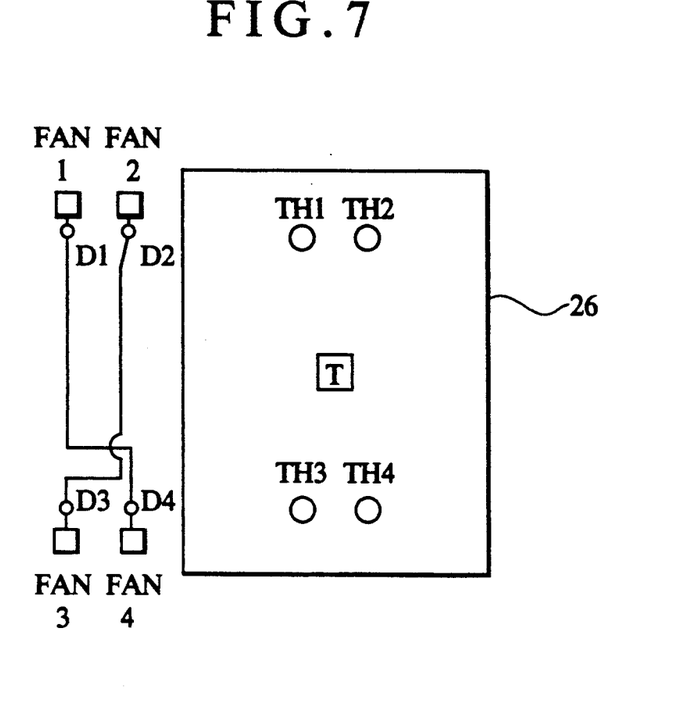
FIG. 7 is a schematic diagram of temperature switches in the food storeroom of the storage equipment.

The first and second heat exchanging pipes 22 and 24 each have its intermediate portion forked into two branches 28 which join again. In the branches 28 there are provided electromagnetic shutters D1 to D4 and fans F1 to F4 as shown in FIG. 6. The electromagnetic shutters D1 to D4 and the fans F1 to F4 are connected in series as depicted in FIG. 7 and they are controlled by thermostats TH1 to TH4 (see FIG. 1) disposed at upper and lower positions in the storeroom 26.

Figure 8:
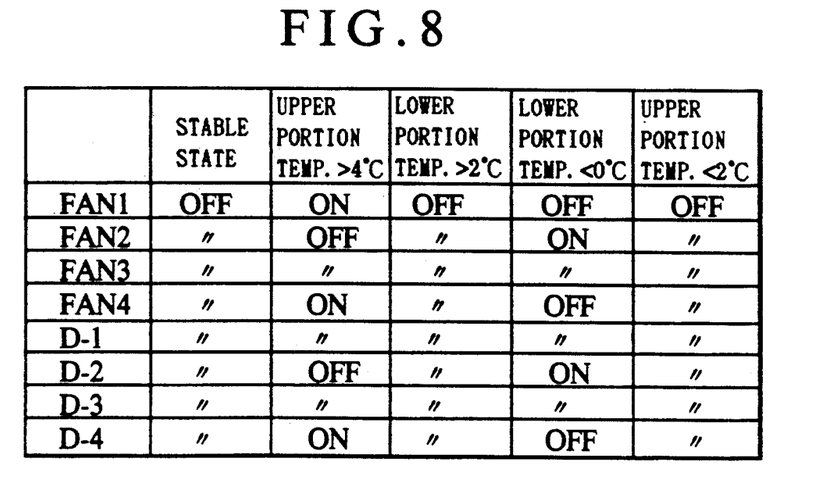
FIG. 8 is a table illustrating ON-OFF control of electromagnetic shutters and fans for controlling the temperature in the food storeroom.

FIG. 8 is a table showing combinations of the operational states (driven or stopped) of the electromagnetic shutters D1 to D4 and the fans F1 to F4 in accordance with the state of the thermostats TH1 to TH4. In this example the thermostats TH1 and TH2 arranged at the upper positions in the storeroom 26 are set so that they turn ON at 4° C. and OFF at 2° C. The thermostats TH3 and TH4 at the lower positions are set so that they turn OFF at 2° C. and ON at 0° C. The electromagnetic shutters D1, D4 and the fans F1, F4 are driven or stopped by the ON-OFF operation of the thermostats TH1 and TH2 disposed at the upper positions, whereas the electromagnetic shutters D2, D3 and the fans F2, F3 are driven or stopped by the ON-OFF operation of the thermostats TH3 and TH4 disposed at the lower positions.

When the temperature at the upper portion of the storeroom 26 is higher than 4° C., the electromagnetic shutters D1, D4 and the fans F1, F4 are driven. In this instance, the first heat exchanging pipe 22 takes therein chilly air at the lower portion of the icehouse 10 and supplies it to the upper portion of the storeroom 26. The second heat exchanging pipe 24 takes therein air at the lower portion of the storeroom 26 and discharges it into the upper portion of the icehouse 10. Thus, the chilly air in the icehouse 10 circulates via the route: lower portion of icehouse 10→upper portion of storeroom 26→lower portion of storeroom 26→upper portion of icehouse 10→lower portion of icehouse 10.

When the temperature at the lower portion of the storeroom 26 is below 0° C., the electromagnetic shutters D2, D3 and the fans F2, F3 are driven. In this case, the first heat exchanging pipe 22 takes therein the air at the upper portion of the storeroom 26 and discharges it into the lower portion of the icehouse 10. The second heat exchanging pipe 24 takes therein, at the upper portion of the icehouse 10, chilly air of a relatively higher temperature than that of the air at the lower portion of the icehouse 10 and supplies it to the lower portion of the storeroom 26. Thus, the chilly air in the icehouse 10 circulates via the route: upper portion of storeroom 26→lower portion of icehouse 10→upper portion of icehouse 10→lower portion of storeroom 26→upper portion of storeroom 26.

In this way, the temperature in the storeroom 26 is held in the range of between 0° and 4° C. and the humidity is held at about 95%.

Figure 9:
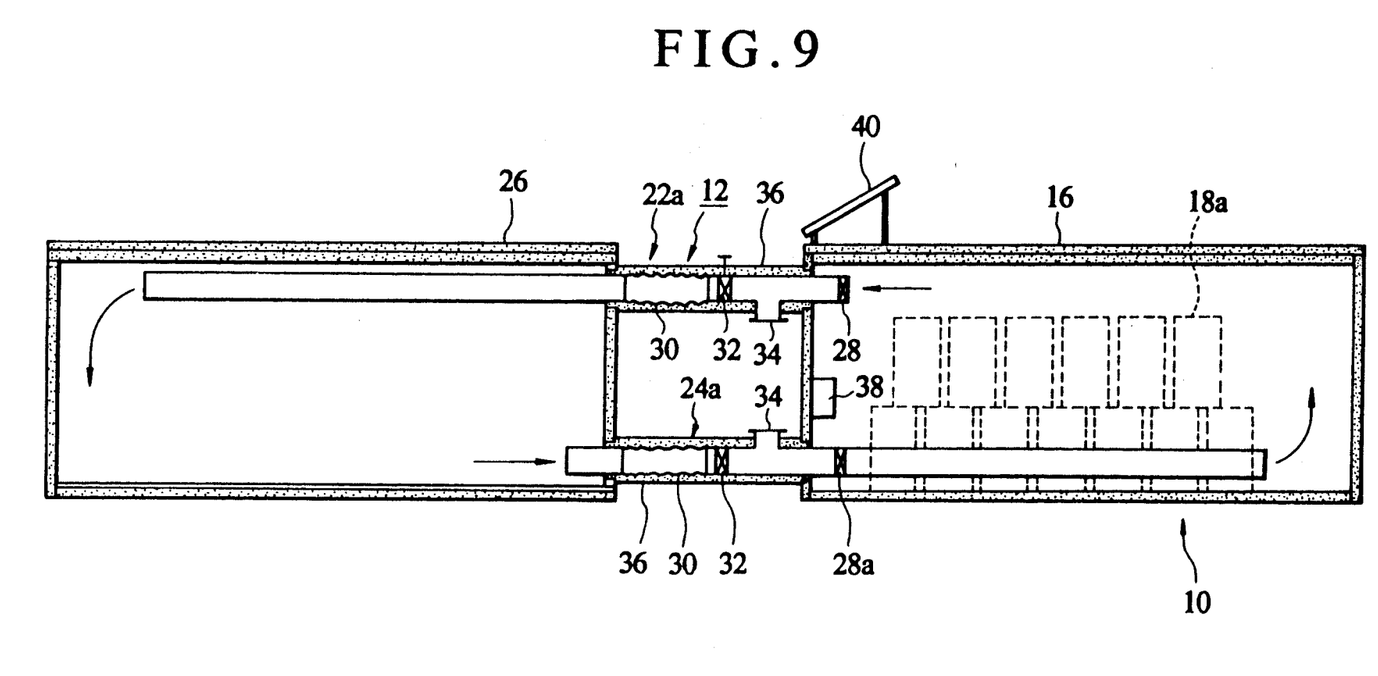
FIG. 9 is a longitudinal-sectional view illustrating another embodiment according to the storage equipment of the present invention.
Figure 10:
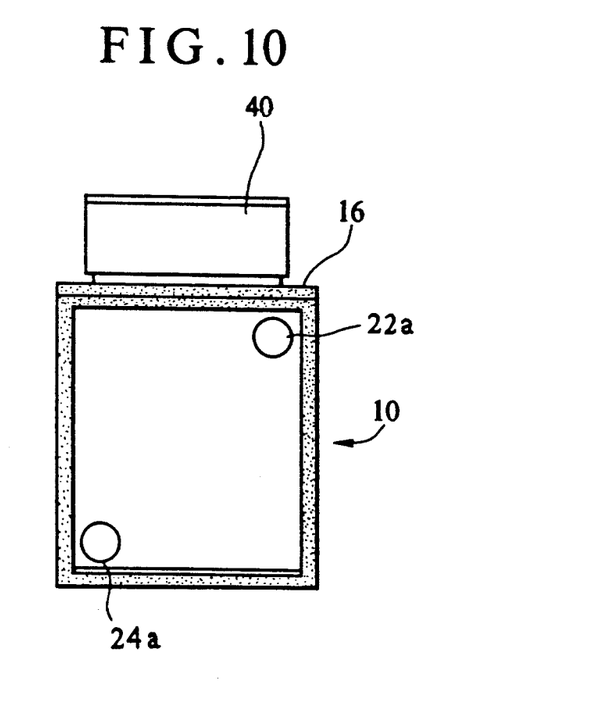
FIG. 10 is its cross-sectional view.

A description will be given, with reference to FIGS. 9 and 10, of another embodiment of the present invention. In the low temperature food storage equipment of this embodiment the icehouse 10 and the storeroom 26 are installed independently of each other and they are interconnected by the detachable heat exchanger 12 interposed between them.

The icehouse 10 and the storeroom 26 are each formed by a parallelepipedic steel container having a door at the outer end thereof, which can be shut airtightly (not shown). The icehouse 10 and the storeroom 26 are both entirely surrounded by heat insulators.

In the icehouse 10 there are stacked drums 18a, which contain water, for instance, having dissolved therein a predetermined amount of salt, and the water is frozen into ice when the outside air temperature becomes low. In the storeroom 26 there is stored a large amount of food (potatoes, for example) contained in cardboard boxes or the like. The drums 18a may also be replaced with the trays 18 used in the embodiment described above.

The heat exchanger 12 includes a pair of straight heat exchanging pipes 22a and 24a, through which the icehouse 10 and the storeroom 26 intercommunicate, and DC-driven axial fans 28 and 28a attached to the heat exchanging pipes 22a and 24a, respectively. The heat exchanging pipes 22a and 24a are larger in diameter than those of the axial fans 28 and 28a. One of the two heat exchanging pipes 22a and 24a which introduces chilly air from the icehouse 10 into the storeroom 26 is provided at the upper portion of the equipment and the other which introduces the air from the storeroom 26 into the icehouse 10 is provided at the lower portion.

The heat exchanging pipes 22a and 24a each have at its intermediate portion a flexible pipe 30 for disconnecting the icehouse 10 from the storeroom 26 while leaving part of the pipe in the storeroom, a manual shutter 32 which is closed when water freezes in the drums 18a in the icehouse 10, and a blank flange 34 for taking in the outside air. The flexible pipes 30, the manual shutters 32 and the blank flanges 34 are covered with heat insulators 36 wrapped around them.

In the icehouse 10 there is provided a battery 38 for driving the axial fans 28 and 28a, the battery 38 being connected to a solar-cell panel 40 mounted on the top of the icehouse 10. With the above storage equipment, the water contained in the drums 18a in the icehouse 10 is frozen and the chilly air in the icehouse 10 is circulated as indicated by the arrows as shown in FIG. 9, by driving the axial fans 28 and 28a, whereby food stored in the storeroom 26 is kept in cold storage.

Since the heat exchanger 12 interposed between the icehouse 10 and the storeroom 26 has the pair of straight heat exchanging pipes 22a and 24a and the DC-driven axial fans 28 and 28a attached to the heat exchanging pipes 22a and 24a respectively, and since the heat exchanging pipes 22a and 24a are larger in diameter than the axial fans 28 and 28a, it is possible to notably reduce pressure losses of the heat exchanging pipes 22a and 24a and to decrease the flow velocity in the pipes while securing appropriate air flow rates therein, thus, the DC-driven axial fans 28 and 28a of low energy loss are employable.

According to this embodiment, the use of the battery 38 and the solar-cell panel 40 for driving the axial fans 28 and 28a makes it possible to keep food in cold storage for a long period of time without the necessity of supplying energy from the outside by energy supply means such as a power supply lead. Incidentally, since the power consumption of the axial fans 28 and 28a is around 10 watts, they can also be driven by wind power instead of the solar-cell panel 40.

As many apparently and widely different embodiments of this invention may be made without departing from the spirit and scope thereof, it is to be understood that the invention is not limited to the specific embodiments thereof except as defined in the appended claims.

What is claimed is:

1. Low temperature food storage equipment comprising:
    an icehouse surrounded by a heat insulator;
    a freestanding transportable food storeroom discrete from and formed independently of said icehouse, said food storeroom also being surrounded by an insulator; and
    a heat exchanger including piping connecting said icehouse with said food storeroom, whereby the food storeroom can be cooled with air chilling in the icehouse;
    at least a portion of said heat exchanger being detachable from said food storeroom such that said food storeroom can be transported separately from said icehouse once said portion of the heat exchanger has been detached from the storeroom.

2. The low temperature food storage equipment as claimed in claim 1, wherein said piping of the heat exchanger comprises a first heat exchanging pipe extending from the lower portion of said icehouse to the upper portion of said storeroom, and a second heat exchanging pipe extending from the upper portion of said icehouse to the lower portion of said storeroom.

3. The low temperature food storage equipment as claimed in claim 2, wherein said first and second heat exchanging pipes each has two branches at its intermediate portion, and said heat exchanger further includes direction switching means provided in each of said branches for selectively restricting and opening the passageway formed by the branch, and air supply means provided in said branches for selectively forcing air in one of opposite directions through each said intermediate portion.

4. The low temperature food storage equipment as claimed in claim 1, wherein said piping of the heat exchanger comprises a pair of straight heat exchanging pipes interconnecting said icehouse and said storeroom, and said heat exchanger further includes DC-driven axial fans attached to said heat exchanging pipes, respectively, the diameters of said heat exchanging pipes being larger than those of said axial fans.

5. The low temperature food storage equipment as claimed in claim 4, and further comprising a solar-cell panel mounted on top of said icehouse, and a battery connected between said solar-cell panel and said axial fans.

6. A cooling source apparatus for keeping food in cold storage with water to be frozen at the outside air temperature, said apparatus comprising:
    an icehouse including an icehouse body, which is provided with a door, and is surrounded by a heat insulator, and a plurality of trays placed one above another in said icehouse body for containing water; and
    a heat exchanger including a pair of heat exchanging pipes having first ends located at upper and lower portions of the interior of said icehouse body, respectively, and second ends detachably connected to and located at upper and lower portions of the interior of a food storeroom, respectively.

7. A temperature control method for low temperature food storage equipment which comprises an icehouse and a food storeroom each surrounded by a heat insulator, a first heat exchanging pipe extending from the lower portion of said icehouse to the upper portion of said storeroom a second heat exchanging pipe extending from the upper portion of said icehouse to the lower portion of said storeroom, and a temperature sensor disposed in said storeroom, said method comprising: sensing the temperature in the storeroom with the temperature sensor, and controlling the directions in which air flows in said first and second heat exchanging pipes on the basis of the temperature sensed by the temperature sensor to thereby circulate air between said icehouse and said storeroom.

8. Low temperature food storage equipment comprising:
    an icehouse surrounded by a heat insulator and having an icehouse body provided with a door, and a plurality of trays place one above another in said icehouse body for containing water which will freeze when the outside air reaches a predetermined temperature;
    a food storeroom also surrounded by a heat insulator;
    a heat exchanger detachably connected to and interposed between said icehouse and said storeroom; and
    a temperature sensor disposed in said storeroom;
    said heat exchanger having a first heat exchanging pipe extending from the lower portion of said icehouse to the upper portion of said storeroom, a second heat exchanging pipe extending from the upper portion of said icehouse to the lower portion of said storeroom, said first and said second heat exchanging pipes each having at its intermediate portion a pair of branches, and an electromagnetic shutter and a fan disposed in each of said branches; and
    said electromagnetic shutters being operatively connected to said temperature sensor so as to be controlled thereby on the basis of the temperature detected by said temperature sensor in a manner in which air is caused to circulate between said icehouse and said storeroom.

* * * * *